United States Patent [19]

Glover, Jr. et al.

[11] 4,114,518

[45] Sep. 19, 1978

[54] PISTON VALVE POCKET RELIEF

[75] Inventors: Glen A. Glover, Jr., Washington; Robert B. Cambron, Peoria, both of Ill.

[73] Assignee: Caterpillar Tractor Co., Peoria, Ill.

[21] Appl. No.: 785,630

[22] Filed: Apr. 7, 1977

[51] Int. Cl.[2] .................................................. F16J 1/00

[52] U.S. Cl. .................................... 92/208; 123/193 P

[58] Field of Search ............................. 92/181 R, 208; 123/193 P

[56] References Cited

U.S. PATENT DOCUMENTS

| | | | |
|---|---|---|---|
| 3,463,057 | 8/1969 | Packard et al. | 92/208 X |
| 3,508,531 | 4/1970 | Squinto et al. | 123/193 P |

*Primary Examiner*—Irwin C. Cohen

*Attorney, Agent, or Firm*—James R. Bell

[57] ABSTRACT

A piston includes a plurality of pockets formed in the piston top face and opening through the piston sidewall. An arcuate relief is associated with each pocket and formed in the sidewall to overlap the pocket opening. The depth of the relief is relatively greater than the depth of the pocket.

3 Claims, 4 Drawing Figures

Fig. 1
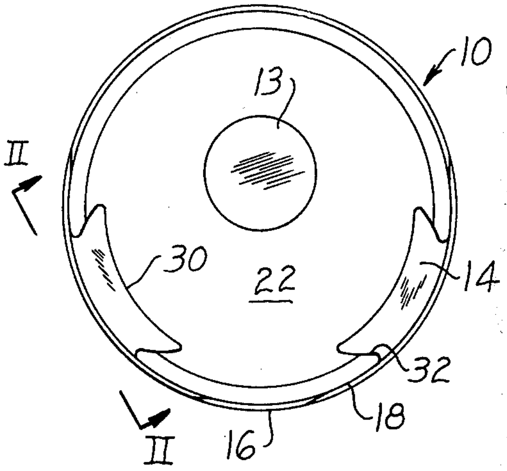
Fig. 2
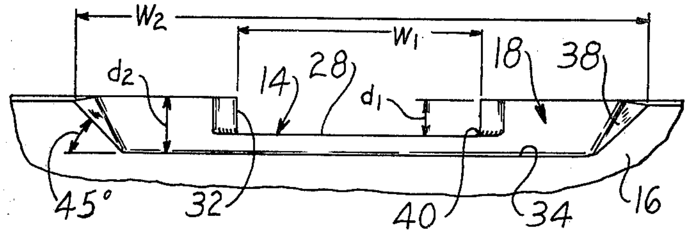
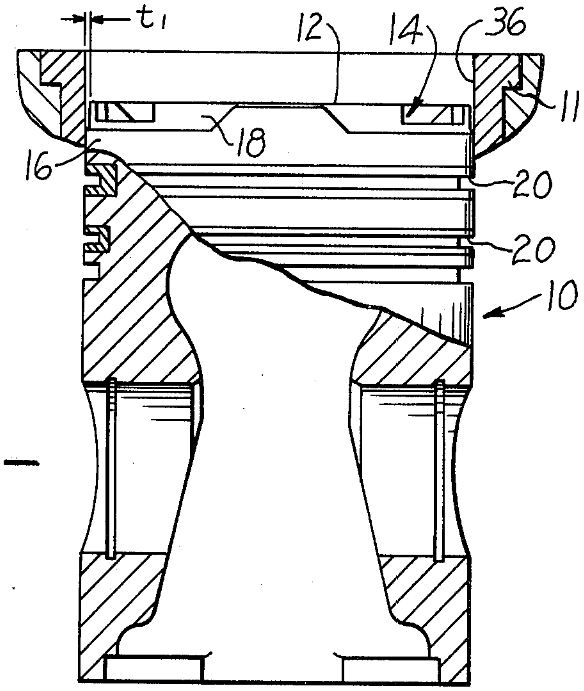
Fig. 3
Fig. 4
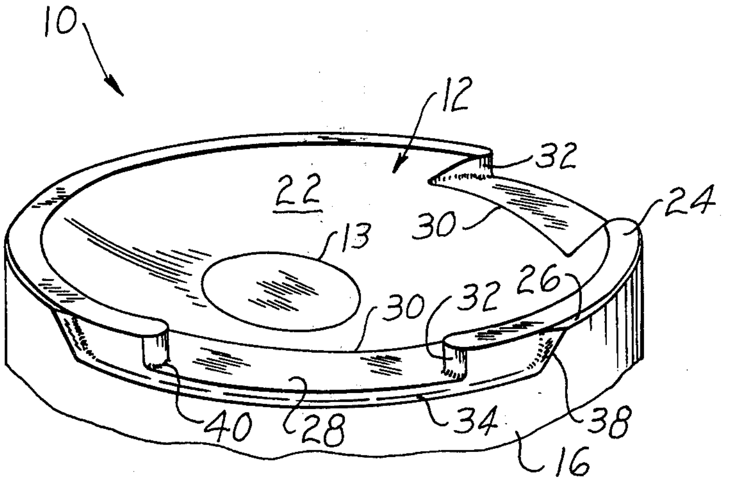

PISTON VALVE POCKET RELIEF

BACKGROUND OF THE INVENTION

1. Field of the Invention

This invention relates generally to internal combustion engines and more particularly to the construction of pistons used therein.

2. Description of the Prior Art:

Valve pockets formed in the top land or face of pistons is well known. However, the portion of the relief opening into the piston sidewall is an area of high thermal concentration between the piston and the cylinder liner. Prolonged thermal concentration can cause cylinder liner and piston ring scuffing. In order to relieve such thermal concentration, one approach has been to cut a full 360° annular relief down along the sidewall of the piston. However, use of the full relief has been found to adversely affect performance such as by causing scuffing and low speed smoke problems. It would be advantageous to provide a piston capable of reducing thermal concentration in the area of the valve pocket and also avoid undesirable performance characteristics.

SUMMARY OF THE INVENTION

The present invention is directed to overcoming one or more of the problems as set forth above.

According to the present invention this is accomplished by providing in a piston, a plurality of pockets formed in the piston face and opening through the piston sidewall. An arcuate relief, less than 360°, is associated with each pocket and formed in the sidewall to overlap the pocket opening. The depth of the relief is relatively greater than the depth of the pocket.

The above and further novel features of the invention will appear more fully from the following detailed description when the same is read in conjunction with the accompanying drawings. It is to be expressly understood, however, that the drawings are not intended as a definition of the invention but are for the purpose of illustration only.

BRIEF DESCRIPTION OF THE DRAWINGS

FIG. 1 is a plan view illustrating the piston valve pockets of this invention;

FIG. 2 is a fragmentary side elevation illustrating the valve pockets as viewed along the line II-II of FIG. 1;

FIG. 3 is a side elevational view in partial cross-section illustrating the piston of this invention; and FIG. 4 is an isometric view illustrating the features of the valve pockets of this invention.

DESCRIPTION OF THE PREFERRED EMBODIMENT

FIGS. 1 and 3 illustrate a piston generally designated 10 in a cylinder liner 11 and including a top face portion 12. A plurality of valve pockets 14 are formed in the face 12. The pockets 14 open through sidewall 16. A less than 360° arcuate relief 18 is associated with each pocket 14 to overlap the portion of the pocket opening through the sidewall. Pockets 14, FIG. 2, have a first depth $d_1$ extending downwardly from top face 12 along the sidewall 16 and relief 18 has a second depth $d_2$ greater than $d_1$ and extending downwardly from top face 12 along sidewall 16. Piston ring grooves 20 are formed in sidewall 16, FIG. 3, at predetermined spaced intervals from top face 12, as is well known.

Top face 12, FIG. 4, commonly includes concave portion or crater 22 concentric with sidewall 16 and a reinforced steel heat plug 13. A substantially flat land 24 having a ring-like shape is formed on top face 12 and spaces or separates concave portion 22 from sidewall 16. Chamfer 26 is formed around piston 10 at the intersection of side 16 and flat land 24 of face 12. The chamfer is preferably milled at an angle of about 45° to a depth of about 0.025 inches.

Valve pockets 14 are formed in top face 12 preferably by milling to a first depth $d_1$ of about 0.225 inches or at least sufficiently deep to provide clearance for the engine valve. The milling operation is accomplished so that pocket 14 extends downwardly from land 24 of top face 12 along sidewall 16 and terminates at a substantially flat bottom 28. The flat bottom 28 intersects concave portion 22 to form an arc 30. Pocket 14 includes an opening having a width designated $w_1$ which may vary depending upon the position of the engine valve relative to the piston. The opening extends through sidewall 16 and is set off by arcuate relief sidewalls 32 at the opening. The arcuate sidewalls 32 extend downwardly from land 24 of top face 12 and terminate at bottom 28. Preferably, sidewall blends into bottom 28 at radius 40. Sides 32 diminish in height between the opening $w_1$ and arc 30.

An arcuate relief 18 is formed along and concentric with sidewall 16 preferably by milling. The reliefs 18 are each less than 360° and overlap the opening. The reliefs 18, as illustrated in the drawings, measure at $w_2$ preferably about 2 times the opening $w_1$. The reliefs 18 extend downwardly from land 24 of top face 12 and terminate at relief bottom 34 at a second depth $d_2$ of about 0.355 inches. The reliefs 18 create an annular recess between cylinder liner wall 36 and piston sidewall 16 preferably at a thickness $t_1$ of about 0.020 inches. Each relief 18 includes angled endwalls 38 each converging preferably at about 45° to the horizontal as the relief 18 extends downwardly from top face 12 to bottom 34 along sidewall 16. Both the endwalls 38 and the bottom 34 are rounded preferably at about 0.060 inches to blend relief 18 into sidewall 16. Thus, as to the pocket 14 and relief 18, sharp corners and pockets are substantially avoided.

In operation, during combustion in cylinder 11 adjacent top face 12, thermal concentration is relieved as it passes sidewalls 32 at opening of pocket 14 and gradually disperses into relief 18 between piston 10 and cylinder liner wall 36.

The foregoing has described a piston capable of reducing thermal concentration at the valve pocket, cylinder liner wall interface which avoids undesirable low speed operating characteristics.

The embodiments of the invention in which an exclusive property or privilege is claimed are defined as follows:

1. In a piston including a cylindrical sidewall and a top face having a concave portion substantially concentric with the sidewall, the improvement comprising:

a plurality of pockets formed in the top face and having an opening terminating at a first circumferential width through the sidewall interconnecting the concave portion and the sidewall, said pockets extending downwardly from the top face terminating at a first depth along the sidewall; and an arcuate relief associated with each pocket, each relief being formed in and concentric with the sidewall overlapping the opening of an associated pocket, terminating at a second width about two times greater than the first width and extending downwardly from the top face to a second depth greater than said first depth.

2. The piston of claim 1 wherein the reliefs include tapered convergent endwalls at the second width extending downwardly from the top face, along the sidewall, and terminating at the second depth.

3. The piston of claim 2 wherein the pockets include arcuate sidewalls formed thereon at the first width.

* * * * *